United States Patent Office 2,827,662
Patented Mar. 25, 1958

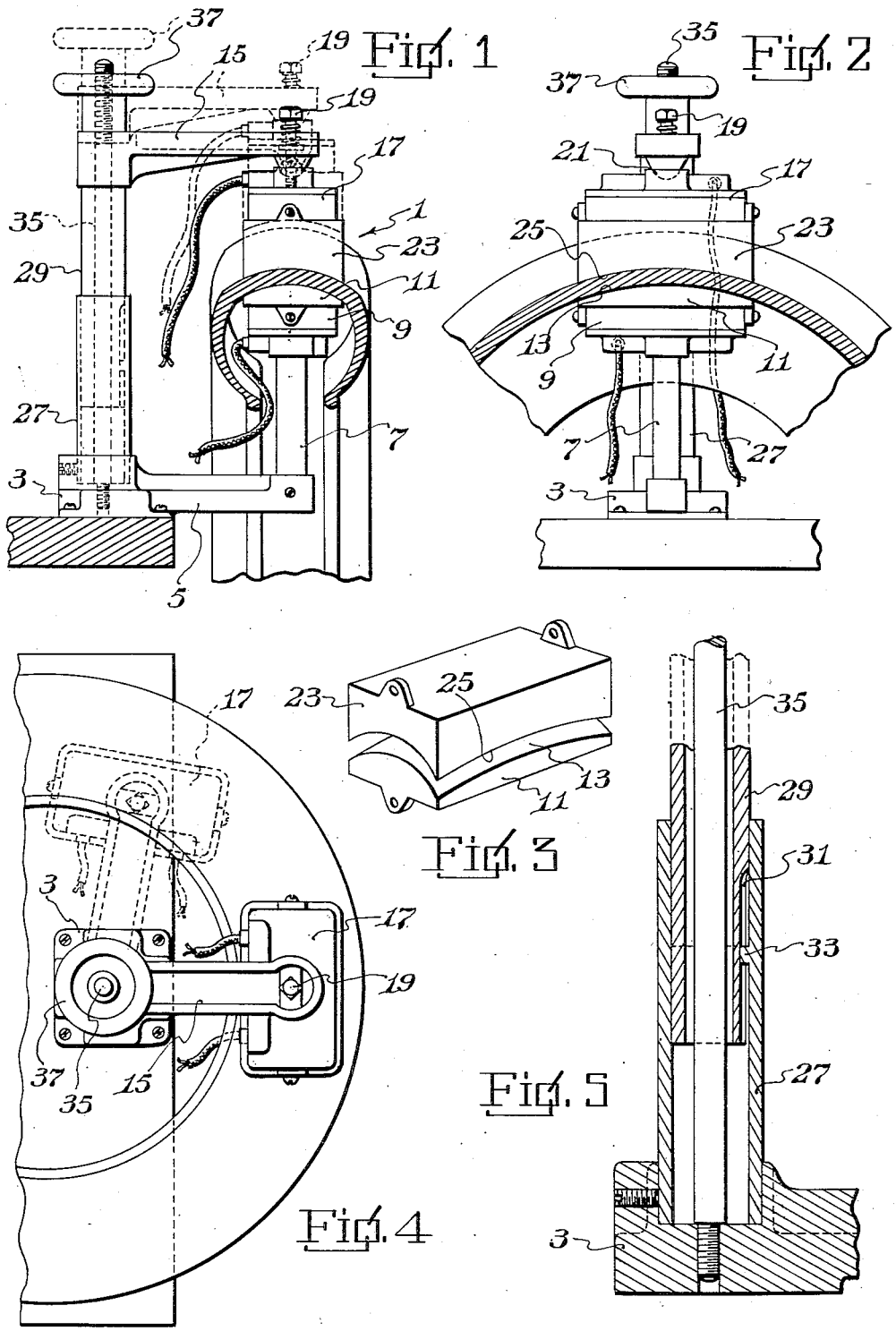

2,827,662
TIRE CASING VULCANIZERS

Charles I. Livingston, Tulsa, Okla.

Application May 24, 1956, Serial No. 587,069

2 Claims. (Cl. 18—18)

This invention relates to tire casing vulcanizers, and more particularly to such devices adapted to vulcanize self-sealing tires.

Heretofore, the art of vulcanizing tire components has dealt largely with the vulcanization of inner tubes. Inner tubes are quite thin and highly flexible and can be readily repaired by vulcanization by the use of heating elements having no special structurel characteristics or functional cooperation. However, with the recent advent of self-sealing tires, the repair of these self-sealing tires by vulcanization has presented problems which cannot advantageously or even successfully be overcome by use of vulcanizing devices known to the prior art. Compared to inner tubes, self-sealing tires are relatively rigid and cannot be substantially flexed during the vulcanizing process. Moreover, the disposition of the beads of self-sealing tires relative to the casing proper has made the vulcanziation of these tires with known devices extremely awkward and laborious.

Accordingly, it is an object of the present invention to provide a tire casing vulcanizer which can conveniently be used in connection with the repair of self-sealing tires.

Another object of the invention is the provision of a tire casing vulcanizer designed to avoid substantial deformation of the tire casing during repair by vulcanization.

Finally, it is an object of the present invention to provide a tire casing vulcanizer which will be relatively easy and inexpensive to construct, simple to operate and maintain, and rugged and durable in use.

Other objects and advantages of the present invention will become apparent from a consideration of the following specification, taken in conjunction with the accompanying drawing, in which:

Figure 1 is a side elevational view of a tire casing vulcanizer according to the invention, looking in the direction of the line 1—1 in Figure 2;

Figure 2 is a front elevational view of a tire casing vulcanizer according to the invention, looking in the direction of the line 2—2 of Figure 1;

Figure 3 is a perspective view of the upper and lower conforming blocks in their opposed or operative position;

Figure 4 is a top plan view of the invention; and

Figure 5 is an elevational cross-sectional view of the supporting means for the upper heating element.

Referring now to the drawings in greater detail, there is shown a tire casing vulcanizer generally indicated at 1 and comprising a base 3 adapted for mounting on a bench or other work support. A lower supporting arm 5 extends laterally forwardly from base 3 and supports at its outer end a supporting standard 7 extending upwardly and having at its upper end a lower heating element 9 including a lower conforming block 11 having a convex upper surface 13.

An upper supporting arm 15 carries at its outer or forward end an upper heating element 17 mounted thereon for limited universal movement by means of a headed bolt 19 fixed to element 17 and extending upwardly through arm 15, and having a coil compression spring acting between the bolt head and the outer end of arm 15 and restrained for a limited universal movement and against excessive vertical movement by a ball and socket joint 21, the ball being on the lower side of arm 15 and the socket being on the upper side of element 17. Element 17 includes an upper conforming block 23 having a concave lower surface 25. Elements 9 and 17 are opposed; and their associated surfaces 13 and 25, respectively, are opposed and complementary. Each surface 13 or 25 has a curvature perpendicular to its associated arm 5 or 15, respectively, of a radius greater than a curvature parallel to that associated arm. In other words, the radii of curvature of the surfaces 13 and 25 as seen in Figure 2 of the drawings are respectively greater than the radii of curvature of those surfaces as seen in Figure 1 of the drawings. In this way, the opposed complementary surfaces conform almost exactly to the natural or unstressed curvature of the tire casing. The heating elements are heated by electrical resistance by current supplied through wires from a current source (not shown).

Means mounting upper heating element 17 on base 3 for vertical and horizontal movement relative to lower heating element 9 are provided, comprising a hollow cylindrical sleeve 27 upstanding from base 3 and a hollow cylindrical member 29 rotatably and axially slidably disposed in sleeve 27 and in turn supporting the inner end of upper arm 15 for vertical movement and rotation relative to base 3. Member 29 has a longitudinally extending keyway 31 in its outer surface extending upwardly from its lower end; and sleeve 27 has an integral key 33 on its inner surface intermediate its ends and adapted to engage in keyway 31 to limit movement of member 29 in its lower position to axial sliding movement only, and to support the lower end of member 29 in the upper position of that member for rotation.

An elongated vertical rod 35 is anchored at its lower end in base 3 and extends upwardly within member 29 and terminates in a screw-threaded upper end. The distance between key 33 and the upper end of rod 35 is greater than the length of member 29. A rotatable screw-threaded locking member 37 is screwed on upper end of rod 35 and is adapted to abut the upper end of member 29 to maintain upper element 17 in its lower or operative position in opposition to lower element 9 and thereby hold a tire casing firmly between elements 9 and 17.

In operation, upper element 17 is raised and swung away from lower element 9. To do this, it is necessary simply to unscrew locking member 37 a certain distance on rod 35 and raise member 29, arm 15 and element 17 until the lower end of member 29 is at least as high as key 33. This upper assembly can be rotated about the common axis of member 29 and sleeve 27 so that keyway 31 and key 33 are no longer aligned. Thereafter, key 33 will engage the lower end of member 29 rotatably to support the entire upper assembly. With the heating elements including in unitary assembly their associated conforming blocks thus separated, a tire casing may easily be slipped onto lower element 9 and will thereafter have interference with no portion of the vulcanizing device. Then, the upper assembly may be rotated back until keyway 31 and key 33 once more align, whereupon member 29 will drop back down a greater distance into sleeve 27 until conforming block 23 of element 17 rests on the upper surface of the tire casing. Locking member 37 is then screwed back down on the upper end of rod 35 until it abuts against the upper end of member 29 and may be screwed even farther down until the tire casing is sufficiently tightly clamped between elements 9 and 17. Should there be any slight misalignment of conforming blocks 11 and 23, the limited universal movement provided by the parts 19 and 21 will enable the blocks to realign themselves relative to each other. Vulcanizing may then proceed in the conventional manner.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

1. A tire casing vulcanizer comprising in combination a base, a lower supporting arm extending laterally from said base, a supporting standard extending upwardly from the outer end of said arm, a lower heating element mounted on the top of said standard, a hollow cylindrical sleeve upstanding from said base, a cylindrical member rotatably and axially slidably disposed in said sleeve, said cylindrical member having a longitudinally extending keyway in its outer surface extending upwardly from its lower end, said hollow cylindrical sleeve having a key on its inner surface intermediate its ends and adapted to engage in said keyway to limit movement of said cylindrical member in its lower positions to axial sliding movement only and to support the lower end of said cylindrical member in its upper position for rotation, an upper supporting arm extending laterally from the upper end of said cylindrical member, and an upper heating element opposed to said lower heating element and mounted on the outer end of said upper supporting arm.

2. A tire casing vulcanizer comprising in combination a base, a lower supporting arm extending laterally from said base, a supporting standard extending upwardly from the outer end of said arm, a lower heating element mounted on top of said standard, a hollow cylindrical sleeve upstanding from said base, a hollow cylindrical member rotatably and axially slidably disposed in said sleeve, an upper supporting arm extending laterally from the upper end of said hollow cylindrical member, an upper heating element opposed to said lower heating element and mounted on the outer end of said upper supporting arm, a rod fixed to and upstanding from said base within said hollow cylindrical member and having screw threads at its upper end, and a screw threaded locking member engageable with said upper end of said rod and adapted to abut the upper end of said hollow cylindrical member to hold a tire casing firmly between said heating elements.

References Cited in the file of this patent

UNITED STATES PATENTS

| 1,411,095 | Henry | Mar. 28, 1922 |
| 1,689,770 | Briley | Oct. 30, 1928 |
| 1,788,568 | Erikson | Jan. 13, 1931 |
| 2,292,485 | Slatkin | Aug. 11, 1942 |
| 2,347,952 | James | May 2, 1944 |

FOREIGN PATENTS

| 261,877 | Sweden | May 31, 1949 |